United States Patent Office 3,011,573
Patented Dec. 5, 1961

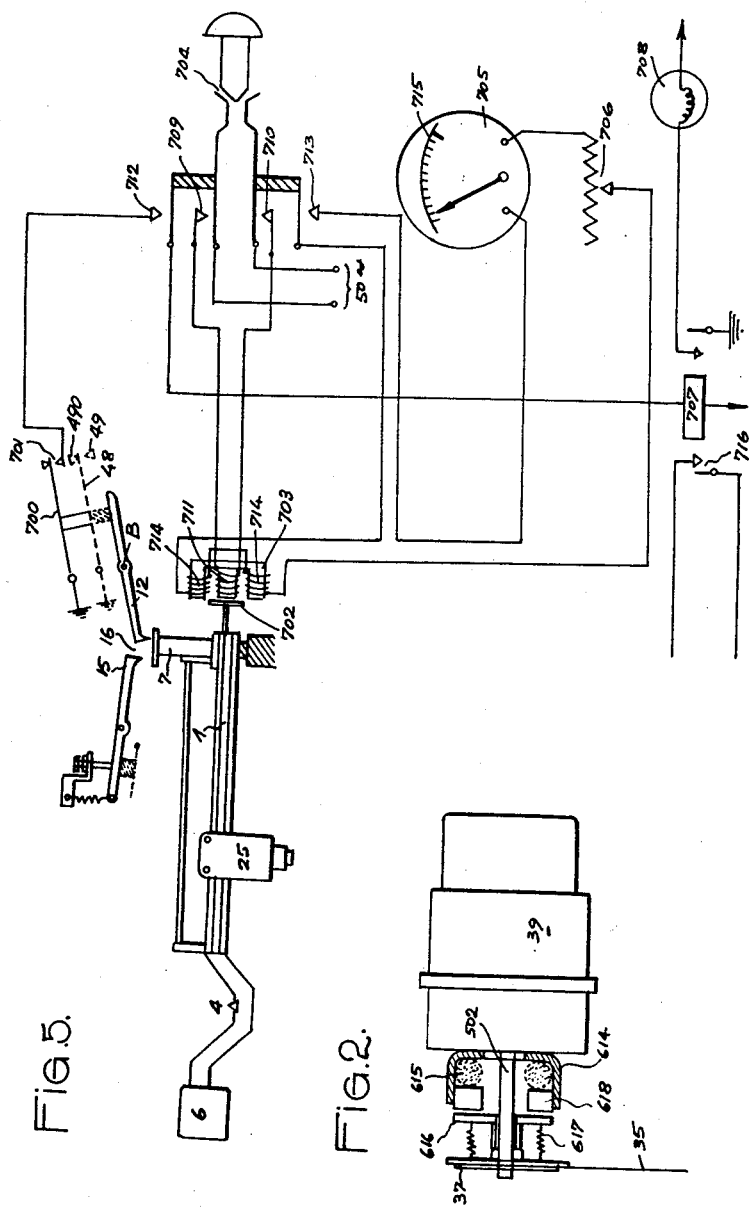

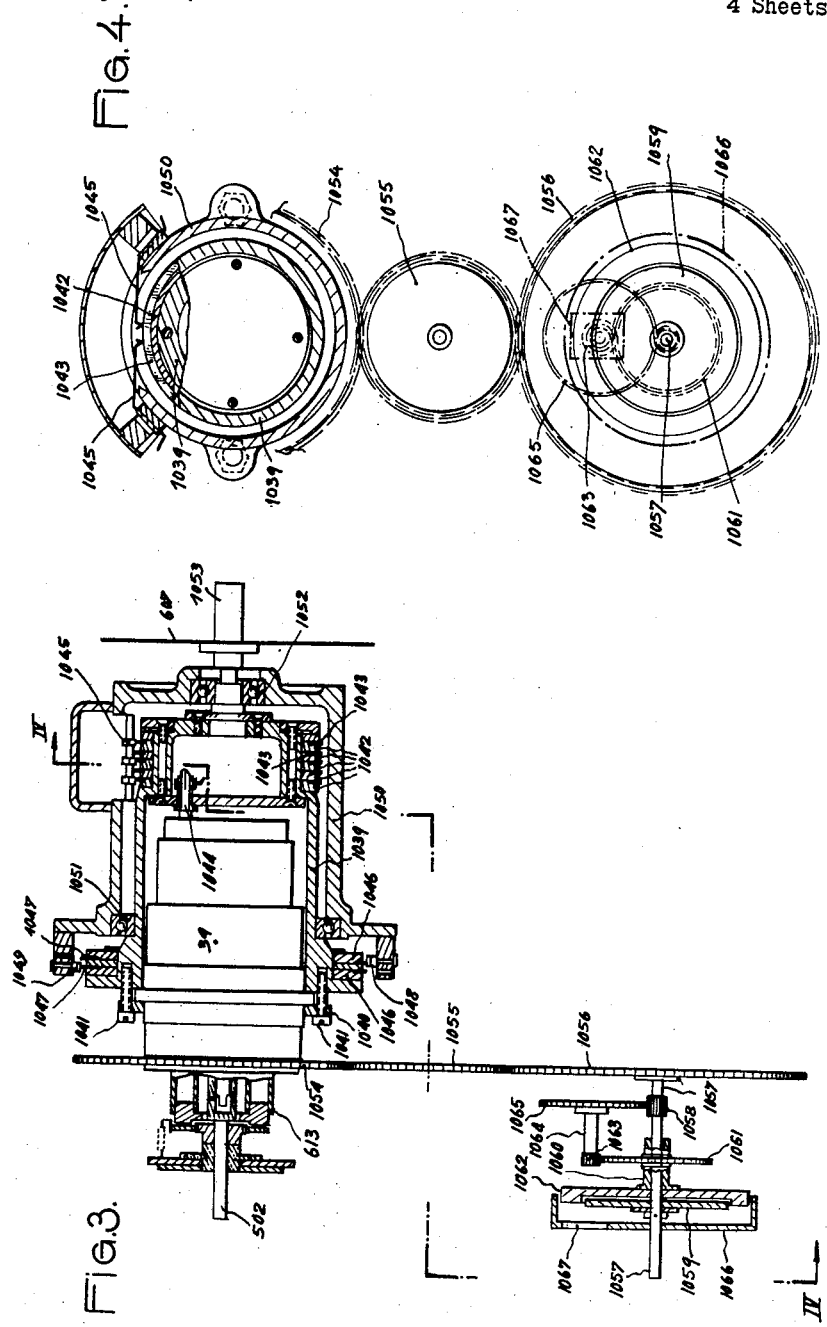

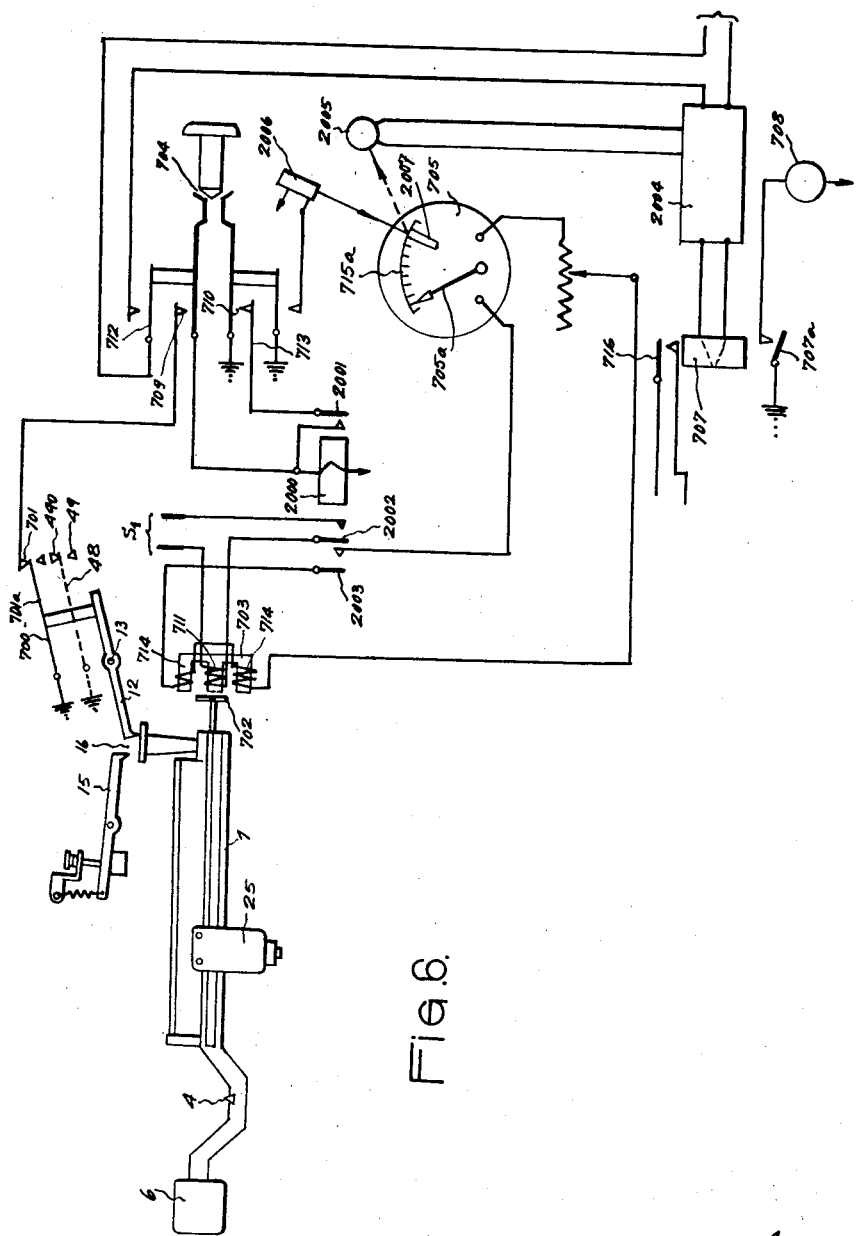

3,011,573
ELECTRICALLY OPERATED AUTOMATIC PLATFORM SCALES
Henri Edouard Alfred Borzer, Bethune, France, assignor to Manufacture de Bethune, Bethune, France, a company of France
Filed Apr. 19, 1960, Ser. No. 23,183
Claims priority, application France Apr. 30, 1959
7 Claims. (Cl. 177—164)

The present invention relates to an entirely automatic electrically operated platform scale, which comprises a beam along which a slide-weight moves composed of a carriage carrying a receiver rotatively driving a pinion cooperating with a rack carried by the beam, the receiver of the carriage being electrically connected to an emitter-transmitter whose rotation is operated in the first place by a motor rotating at high speed and in the second place by a motor rotating at low speed, so that, owing to the rotation of the rotor of the emitter-transmitter, the rotor of the receiver mounted on the carriage forming a slide-weight moves the latter so that it brings the beam into equilibrium, which causes the stoppage of the aforesaid motors, the emitter-transmitter and the receiver; by means of a pointer, the weight is thus ascertained of the object weighed on the scales, this pointer, which moves in front of a graduated dial, being integral with the rotor of the emitter-transmitter.

The present invention relates more particularly to apparatus for the setting of the pointer to zero so as to show the weight of the material weighed by the scales, this apparatus for setting the pointer to zero also being able to set to zero other types of indicating devices, for example, indicators by printing.

This device for setting to zero either by hand or automatically is especially advantageous, for it enables the net weight to be ascertained of goods placed in any kind of receptacle. Furthermore, the device described also enables the scales to be speedily returned to their starting point, the members being then inoperative, then the positioning of the members to enable, by means of the scales, the filling of a receptacle to the desired weight of the goods placed therein.

In accordance with the invention, an emitter-transmitter, which is fixed on a disc driven by a gear box subjected to the action of a motor, has an electro-magnetic clutch on its front face enabling the whole of the emitter-transmitter to be revolved to bring indicating devices integral with the rotor to zero.

FIGURE 2 is an elevation, partly in section, of a member of the device shown in FIGURE 1.

FIGURE 3 is an elevation-section of an alternative of the fitting of the emitter-transmitter.

FIGURE 4 is a section along the line IV—IV of FIGURE 3.

FIGURE 5 is a diagram of the device enabling the filling of a receptacle with a given quantity of an article.

FIGURE 6 is a diagram of an alternative embodiment of the device enabling the filling of a receptacle with a given quantity of an article.

Figure 1:
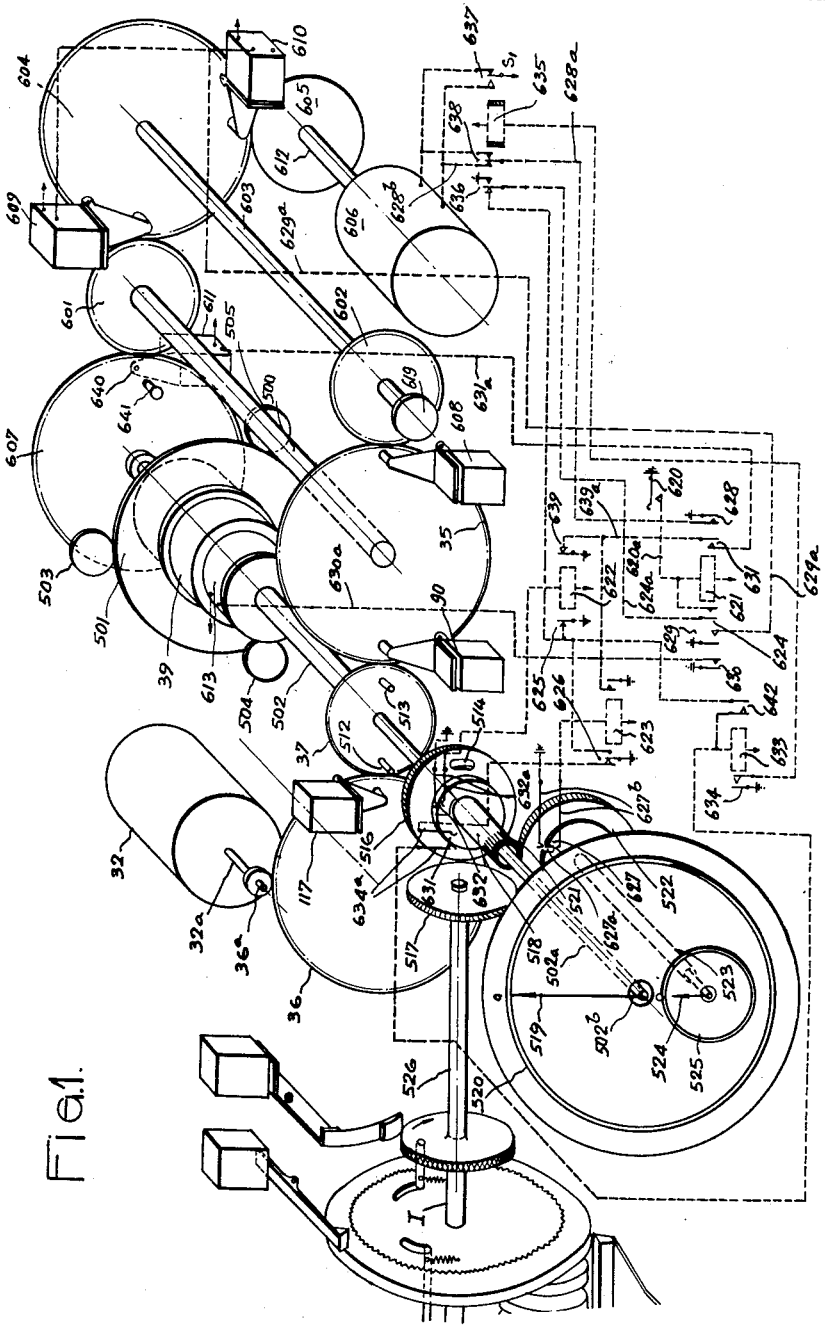
FIGURE 1 is a diagrammatical view in perspective of the automatic weighing device.

In FIGURE 1, the emitter-transmitter 39 is fixed on a disc 501 resting on three rollers 503, 504, 505 spaced 120° from each other and mounted on spindles integral with one of the plates fixed on the frame of the machine. The casing of the emitter-transmitter 39 carries, at its rear part, a pinion 607 which can mesh with a pinion 601 mounted on a shaft 500 resting in bearings fixed in the frame of the machine. Another pinion 604 meshing with the pinion 601 is mounted on a shaft 603, carrying a pinion 602 at its other end, cooperating with the pinion 35 integral with the shaft 500. The high-speed motor 606, which is fixed on the frame of the machine, drives a shaft 612 integral with a pinion 605. The shaft 502 carries the pinion 37 which meshes, on one side, with the pinion 35, and on the other, with the pinion 36 whose rotation is controlled by a pinion 36a fixed to the end of the shaft 32a of the motor 32 driving the slide-weight at low speed. The pinion 37 carries two fingers 512—513, diametrically opposed, which normally penetrate into slots 514 cut in a pinion 516 integral with a bushing 518 mounted loosely on the shaft 502 whose extension 502a carries the pointer 519 rotating in front of a dial 520. The bushing 518 is integral with a disc 631 provided with a conductor quadrant 632. The front end of the bushing 518 is machined to form a pinion 521 cooperating with a pinion 522 integral with a shaft 523 carrying a pointer 524 at its end, revolving in front of a dial 525. A disc 627, integral with the pinion 522, comprises a notch 627a whose purpose will be explained farther on. The reduction obtained by the pinions 516, 521, 522 in the present case is such that for one revolution of the pointer 519, the pointer 524 only moves by one graduation. The pinion 516 cooperates with a pinion 517 for driving a shaft 526 at whose end there is mounted, for example, a printing device I.

In FIGURE 2, the front face of the emitter-transmitter 39 carries the body 614 of a magnetic clutch 613 whose coil 615 is connected to the electric circuit operating the scales for being put under voltage whenever necessary. The circular armature 616 of the clutch can slide along grooves machined on the shaft 502. Springs 617 return the mobile armature 616 as far as possible from the lining 618 which is generally made of the material known in commerce as "Ferodo."

The pinion assembly 37, 35, 601, 602, 604, 605 and 607 forms a gear-box whose combinations of pinions enable either an increase in the rotation speed of a certain number of members, or a reduction of their rotation speed. In the present case and by way of example, the ratio between the flexible pinions (large pinions) and the non-flexible pinions (small pinions) is 2/1. We see that the angular speed of the pinion 37 is either double or half that of the pinion 605 coupled up to the high-speed motor 606, according to the pinions engaged.

When, after a receptacle has been weighed, it is required to cancel the tare represented by that article with a view to ascertaining the net weight of the contents put into the receptacle, this cancelling is first of all done by hand. In this case, the clutch 613 and electro-magnets 611, 609 are put under voltage by pressing a button (not shown). By turning the milled knob 619 fixed at the end of the shaft 603 in the required direction, this shaft is driven, then the flexible pinion 604 which meshes with the pinion 601; the latter re-transmits its movement to the flexible pinion 607 released owing to the electro-magnet 611 being put under voltage. This pinion 607 being integral with the emitter-transmitter 39, the casing of the latter revolves like the shaft 502 as the clutch 613 is under voltage. The pointers 519 and 524 can thus be set at zero. Likewise, the rotation of the shaft 502 causes, through the pinion 37 and its fingers 512, 513, the rotation of the pinion 516, then the pinion 517, and the printer I, fitted at the end of the shaft 526 is also returned to zero.

As soon as this operation is terminated, the operator releases the button which opens the switch and, owing to this, the clutch 613 and electro-magnets 611 and 609 are no longer energized.

It should be noted that the slide-weight of the scales remains in the balanced position corresponding to the weight of the tare because the indicator and printer devices alone have been returned to zero.

Also, after having weighed the weight of the tare, the indicating and printing devices can be brought automatically to zero by means of the high-speed motor 606.

For starting the operation, the grounded push-button 620 is pressed for a moment, which has the effect, by means of the conductor 620a, of putting the relay 621 under voltage by means of the following circuit:

Feed to the relay (denoted by the small arrow)
Winding of the relay 621—conductor 620a—
Push-button 620—ground.

This relay, through the contact 624, the conductor 624a, the inoperative contact 636 and the working contact 626 of the relay 623, finds a ground behind this latter contact.

The relay 623 is under voltage as the pointers 519 and 524 are no longer at zero following the weighing of the receptacle; the friction contacts 627b are thus connected and on this account close the excitation circuit of the relay 623 which has attracted its working contact 626. Putting the relay 621 under voltage has caused the contact 628 to close, and owing to this, the motor 606 is supplied by the following circuit:

Source S₁—inoperative contact 637—motor—
Conductor 628b—inoperative contact 638—
Conductor 628a—contact 628—ground.

At the same time, the relay 621 has drawn the grounded contact 629 and, by the conductor 629a, the electro-magnets 610 and 609 are grounded. They are thus energized and cause the pinion 604 to mesh. This also applies to the clutch 613 which finds a ground by means of the conductor 630a connected to the contact 630 integral with a ground. Finally, the contact 631 of the same relay 621 enables the brake electro-magnet 611 to be put under voltage which is fed by the following circuit:

Current source—electro-magnet 611—conductor 631a—contact 631—
Conductor 639a—resting contact 639—ground—

When the motor 606 revolves, it drives the pinions 605, 604, 601, 607, the casing of the emitter-transmitter 39 and, as the electromagnetic clutch 613 is under voltage, the shaft 502. The movement is transmitted to the pinions 37, 516 and finally to the bushing 518. The shaft 502 and the bushing 518 respectively return the pointers 519 and 524 to zero.

It will be seen that owing to the ratios of the pinions meshed, the emitter-transmitter 39 revolves at an angular speed equal to half that of the shaft of the motor 606. Putting the pointers back to zero causes, by means of the pinions 516, 517, and the shaft 526, the printer I to be put back to zero.

The disc 534 by revolving, closes the circuit of the contacts 632a at each passage of the quadrant 632, which actuates the relay 622. However, the opening of the contacts 625 and 639 of this relay is of no importance because the relay 623 is under voltage on account of its feed circuit being closed by the friction contacts 627b and that the pointer 524, integral with the shaft 523, has not yet returned to the vicinity of zero. As soon as the pointer 524 is near to zero and that one of the brushes 627b has dropped into the notch 627a, the relay 623 is no longer fed and drops. Likewise, when the pointer 519 reaches zero, the friction contacts 632a close the feed circuit of the relay 622. The dropping of the relay 623 enables the contacts 625 and 639 to open, causing, on the one hand, the opening of the feed circuit of the brake electro-magnet 611, and on the other, the end of the energizing of the relay 621. The opening of the circuit of the brake electro-magnet 611 causes the instantaneous uncoupling of the flexible disc 607 from the pinion 601 and the locking of this disc 607 between the stop 640, integral with the electro-magnet 611, and the fixed stop 641.

The whole of the assembly formed by the flexible disc 607, the emitter-transmitter 39 and its shaft 502, are thus locked in the position corresponding to the zero of the two pointers 519 and 524.

The opening of the feed circuit of the relay 621 by the relay 622 causes the fall of this first relay, but as it is delayed, the motor 606 only stops a fraction of a second later. At the same moment, the feed circuit of the electro-magnets 609 and 610, as well as the clutch 613, is cut.

The automatic taring operation is thus terminated and the scales are ready for weighing the net weight of the article or articles to be placed in the previously weighed receptacle. The slide-weight of the platform scales is, as stated above, remaining in the balance position corresponding to the weight of the weighed receptacle.

Weighing then takes place as described in patent application No. 747,049, filed on July 7, 1958 now Patent 2,987,131.

When the receptacle and contents have been weighed and the whole removed from the platform of the scales, it is necessary to put back the slide-weight, pointers 519, 524 and printer I to zero. This operation is then carried out in two stages:

(1) Setting the slide-weight to zero by weighing the platform empty, (2) Starting up a new weighing which is automatic, returning the pointers and printer assembly to zero.

During the first operation, which consists of weighing, the platform of the scales being empty, the pointers and printing rollers, owing to weighing empty, are in a position behind zero equal to the weight of the receptacle weighed at the beginning. Thus, by an automatic weighing operation the pointers and printer must be returned to zero. As for an ordinary weighing this operation can be performed by hand by means of a milled knob 619. Automatic weighing can also be effected, but then it is necessary for the high speed motor 606 to revolve in the opposite direction to the direction used for cancelling automatically the tare. The indication of the change or rotation direction of the motor is given by the relay 633 controlled by the friction contact pieces 634a offset in relation to the brushes 632a.

Putting under voltage of the relay 633 takes place as follows:

When returning the slide-weight to zero, the pointers pass in front of zero, before going beyond, the relay 633 is energized by the following circuit:

Feed—winding of the relay 633—
Brushes 634a connected by the contact piece stud 632—
Resting contact 626 of the relay 623 (which is no longer fed at this moment)—ground—

The relay 63 is maintained by a following circuit:

Battery—winding of the relay 633—working contact 642—
Resting contact 625 of the relay 622 not energized—ground.

But before the relay 622 is again put under voltage on account of the brushes 632a and metal quadrant 632, the relay 623 will be actuated by the closing of its feed circuit by the brushes 627b so that the relay 633 will continue to be fed by the resting contact 626 of the grounded relay 623.

The passing of the pointers beyond zero during weighing empty has thus been recorded by putting under voltage and maintaining the relay 633. The working contact 634 of the relay 633 puts the reversing relay 635 under voltage.

At the end of the zero weighing, we thus find the following positions:

(a) The slide-weight is in its resting position, (b) The pointers and printing device are beyond zero,
(c) The relays 633 and 635 are under voltage.

As previously mentioned, the push-button 620 is pressed at this moment. Everything then happens as for automatic weighing described above with the sole difference that the motor 606, having its feed reversed by the relay 635, revolves in the opposite direction. When the pointers go beyond zero the relay 633 drops, its maintenance circuit being open owing to the opening of the feed circuit of the relay 623 (the brushes 627b no longer effecting the circuit) and the putting under voltage of the relay 622 (the brushes 632a are pressing against the metal quadrant 632). However, the rotation of the assembly still continues during a fraction of a second, as the reversing relay 635 is delayed. The consequence of this movement is that the pointers and printer go slightly beyond zero during the discharge time of the delayed relay 635. When the latter drops, the passage of the current in the motor 606 is again reversed and the assembly begins to revolve in the same direction as for the usual automatic weighing already described.

Finally, when the pointers reach zero, the assembly stops as already described.

Stopping at zero thus takes place in all cases in the same rotation direction, which enables a perfect stopping position of the pointers to be obtained in front of zero.

In FIGURE 3, the emitter-transmitter 39 is placed inside a casing 1039 and held there by a strap 1040 fixed by screws 1041 screwed into the front face of the casing 1039. At its rear part, the latter comprising insulating blades 1042 securing contact rings 1043 electrically connected to the points 1044 of the emitter-transmitter 39. Brushes 1045 effect the connection of the rings 1043 with the electric wires feeding the emitter-transmitter 39. Insulating blades 1046 secure two rings 1047 enabling the electric connection of the electro-magnetic clutch 613 with the circuits described in the preceding example. Brushes 1048, 1049 cooperate with the rings 1047.

The assembly formed by the emitter-transmitter 39 and the casing 1039 is placed inside a casing 1050 with the interposition of ball bearings 1051, 1052 enabling the rotation of the emitter-transmitter 39 and casing 1039 in relation to the casing 1050. A shaft 1053 integral with the casing 1039 is placed in the ball bearing 1052 and carries the pinion 607.

The front face of the emitter-transmitter 39 is integral with a pinion 1054 meshing with a counter-pinion 1055 cooperating with a pinion 1056 mounted on a shaft 1057 carrying, on the one hand, a pinion 1058, and on the other a rotatory dial 1059.

A sleeve 1060 loosely mounted round the shaft 1057, carries, at its rear part, a pinion 1061, and at its front part, a second rotatory dial 1062. The pinion 1061 meshes with a pinion 1063 mounted on a shaft 1064 integral with a second pinion 1065 meshing with the pinion 1058.

The gear box formed by the pinions 1058, 1065, 1063, 1061 is calculated so that for one complete revolution of the rotatory dial 1059, the dial 1062 only moves by one division. A mask 1066 drilled on its front face with a window 1067 is placed in front of the rotatory dials 1059 and 1062, so that only the indications appear placed on the upper part of these rotatory dials.

As explained above, when after having weighed a receptacle, the pointers 519 and 524 are returned to zero, the emitter-transmitter 39 is given a certain number of turns which are recorded by the rotatory dials 1059 and 1062. Thus, the user can at any moment have the exact weight of the tare in front of his eyes.

After having weighed the contents and receptacle, the user can also obtain the gross weight, by again bringing the pointers 519 and 524 to zero and revolving the emitter-transmitter 39, which causes the rotation of the dials 1059 and 1062 which then record the gross weight.

In FIGURE 5, an additional element is shown which enables the filling of a receptacle by a predetermined quantity. It happens in actual practice that the tare of a receptacle often has to be cancelled when empty so as to be able to fill this receptacle under the control of the scales. It is then necessary to pre-position the slide-weight in the balance position when the receptacle is to be filled with a liquid, for instance. This pre-positioning of the slide-weight takes place by following its progress on the reading dial.

When the pointers are at zero by automatic weighing after weighing the receptacle, the shaft 502 of the emitter-transmitter is revolved, and by this operation the pointers 519 and 524 are brought on the one hand, opposite to the required weight of liquid, and on the other hand, the slide to the position corresponding to the total weight of the receptacle and liquid which must be contained in this receptacle.

For carrying out this operation, one proceeds in the following manner:

(1) The high speed motor 606 is used for bringing the pointers and slide to the vicinity of the desired weight.

(2) The exact weight is adjusted by hand by means of the milled knob 619.

The pre-positioning of the slide destroys the balance of the beam 1 which had just been reached by the weighing of the receptacle.

Under the action of the slide-weight 25, the beam 1 assumes the low position.

When filling is proceeded with and the required weight is reached, the beam rises and the device must show the operator that this balance position is reached.

This being done, if so required, an ordinary weighing can be started for checking the exact weight of the liquid thus poured into the receptacle.

The operation for pre-positioning the slide is as follows:

By means of a push-button, the magnetic clutches 610, 608 and 90 are energized at the same time that the high speed motor 606 is fed.

In these conditions, the following pinions are engaged: 605, 604, 602, 35 and 37.

The shaft 502 of the emitter-transmitter 39 is thus driven at half the angular speed of the shaft of the motor 606. During the whole of the time that the operator pushes the button, not shown, the pointers 519 and 524 and the slide advance.

When the pointers are near to the weight desired, the operator releases the button and the assembly stops.

For exactly adjusting the pointers on the weight required, the operator presses with one hand on another button which puts the clutches 608 and 90 under voltage, and with the other hand, turns the milled knob 619 so as to bring the pointers to the required point.

During this movement the pinions 602, 35 and 37 are engaged.

Throughout this operation, seeing that the stator of the emitter-transmitter has remained inoperative, the receiver of the slide-weight has revolved for a number of revolutions equal to those of the shaft 502, so that it is placed exactly on the beam 1 at a point corresponding to the balance to be reached at the moment of filling the receptacle.

FIGURE 5 shows the beam 1 in the low position after pre-positioning the slide to the required weight.

The lever 12 cooperating with the stud 7, controls a supplementary contact-piece 700 whose contact 701 is regulated for closing at the moment when the beam reaches the balance position by rising from bottom to top by the filling of the tank.

A magnetic metal armature 702 is fitted at the end of the beam 1, which moves, when the beam oscillates, in front of the coils of a differential transformer 703.

The latter is attached to the frame of the scales so that the beam being in its low position, the armature 702 is placed symmetrically in relation to the poles of the differential transformer 703.

Finally, an electric push key 704, an instrument for measuring current intensity 705, a rheostat 706, a relay 707 and a tell-tale lamp 708 complete the equipment of FIGURE 5.

The assembly works as follows:

After having pre-positioned the slide in relation to the weight corresponding to the liquid to be put into the receptacle which is on the scales, the operator pushes the button 704 in.

This has the effect:

(1) To connect, by means of the contacts 709 and 710, an alternating current source to the primary 711 of the transformer 703.

(2) To prepare, by the contact 712, a circuit for the relay 707.

(3) To connect, by means of the contact 713, the measuring instrument 705 to the two coils 714 forming the secondary of the differential transformer 703.

Owing to the position along the symmetry axis of the transformer, of the armature 702, the currents induced in the two coils cancel out and the pointer of the measuring instrument 705 remains at its zero position.

The filling of the receptacle can now commence.

When a sufficient weight of liquid has been put in the beam 1 of the scales begins to rise progressively as the weight of the liquid approaches the weight corresponding to the position of the slide.

As soon as the beam begins to rise, the armature 702, moving in front of the differential transformer 703, unbalances the differential circuit of the secondary coils 714 and a current is set up in the measuring instrument whose pointer begins to move.

As the beam progressively approaches the balance position, the pointer of the instrument 705 approaches the mark 715 which it reaches when the beam reaches the horizontal balance position.

The concordance between the position of balance of the beam and the pointer of the measuring instrument facing the mark 715 is regulated once and for all by means of the rheostat 706.

The movement of the pointer of the measuring instrument thus shows the operator that the required weight is approaching.

At the same moment, i.e., when the beam reaches the balance position, the lever 12 controlling the contact piece 700 causes the contact 701 to close, putting the relay 707 under voltage.

The working of the latter is for the purpose of feeding a warning lamp 708 which lights up therefore at the same moment that the pointer of the instrument 705 reaches the mark 715.

The operator is thus warned by the pointer of the measuring instrument 705 and the lamp 708 that he must stop filling the receptacle.

If the liquid reaches the receptacle automatically, for example, by means of an electro-valve, the working of this valve can be controlled by the contact 716 of the relay 707 which thus automatically stops the liquid from arriving when the required weight is reached.

In FIGURE 6, the device also enabling automatic filling is slightly different from that described by means of FIGURE 5. As in the preceding case, the slide 25 is positioned in relation to the weight of the product to be put into the receptacle which is on the platform of the scales. The beam 1 then assumes a low position which has the effect of closing the contact 701a of the switch 700.

The user then pushes in the button 704, which has the effect of energizing the relay 2000. The latter is fed by the following circuit: battery, winding of the relay 2000, contact 709, contact of the button 704, contact 701, contact 701a, ground. The relay 2000 is energized and closes a maintenance circuit by means of the contact 2001. From this moment, its feed is as follows: battery, winding of the relay 2000, contact 2001, contact 710, second contact of the button 704, ground.

Putting the relay 2000 under voltage has the effect:

(1) Of connecting, by means of the contact 2002, a current source S₁ to the primary 711 of the differential transformer 703, (2) To connect, by means of the contact 2003, the measuring instrument 705 to the two coils 714 of the differential transformer 703.

Owing to the position along the symmetry axis of the transformer of the armature 702 in the low position of the beam, the currents induced in the two coils 714 cancel out and the pointer of the measuring instrument remains at zero.

At the moment when the operator has pushed in the button 704, the contact 712 has closed the feed of the amplifier 2004 cooperating with a photo-electric cell 2005. The contact 713 of this button has also closed a feed circuit of the lighting lamp 2006 cooperating with the photo-electric cell 2005. A window 2007 is made in the measuring instrument 705 facing the total filling position and a small mirror is mounted behind the pointer 705a of the measuring instrument 705.

At this moment, the filling of the receptacle is proceeded with. In filling, the receptacle causes the beam 1 of the scales to rise gently. As soon as the beam begins to rise, the armature 702, moving in front of the differential transformer 703, unbalances the differential circuit of the secondary coils 714 and a current is set up in the measuring instrument whose pointer 705a begins to move in front of the graduation 715a.

When the pointer 705a comes in front of the window 2007, the small mirror reflects the light ray emitted by the lamp 2006 and this ray strikes on the photo-electric cell 2005. At this moment, the weight of the product put into the receptacle corresponds to the weight determined by the position of the slide 25 on the beam 1.

The relay 707 is then energized from the photo-electric cell 2005 by the amplifier 2004 and the relay 707, becoming energized, attracts the contact 707a which closes the feed circuit of the lamp 708.

The user is then warned, on the one hand, by the pointer 705, and on the other, by the lamp 708, that the filling of the receptacle is finished and that he must immediately close the intake of the product. If this intake occurs automatically, for example, in the case of a liquid, an electro-valve can be controlled by the contact 716 which closes while putting this electro-valve under voltage, stopping the flow of the liquid.

Various modifications can moreover be applied to the form of embodiment shown and described in detail, without going outside the scope of the invention.

I claim:

1. Electrically operated automatic platform scales having a slide-weight movable along a beam by a servo system having a receiver and an emitter-transmitter having a casing and a rotor, said casing being fixed on a disc driven by a gear box subjected to the action of a motor, an electro-magnetic clutch on its front face for locking the rotor to the casing to enable the whole of the emitter-transmitter to be revolved to bring indicating devices integral with the rotor to zero.

2. Platform scales according to claim 1, characterised in that the emitter-transmitter is placed inside a casing that can revolve in relation to a second casing attached to the frame of the scales, the whole revolving driving two concentric dials giving the weight of the tare when the latter is cancelled by rotating said emitter-transmitter.

3. Platform scales according to claim 1, characterised in that the operation of the gear box and the feed of the motor is controlled by a relay box stopping the feed of the motor and disengaging the box when the indicating devices of weight are brought back to zero.

4. Platform scales according to claim 3, characterised in that the relay box is controlled by friction contacts which cut off the feed of this box when the indicating devices are returned to zero.

5. Platform scales according to claim 1, characterised in that a differential transformer, cooperating with a mobile armature placed at the end of the beam, enables the quantity of the product falling into the receptacle to be controlled.

6. Platform scales according to claim 5, characterised in that the differential transformer controls, on the one hand, a dial, and on the other, a circuit feeding a tell-tale lamp.

7. Platform scales according to claim 5, characterised in that the pointer of the controlling appliance driven by the differential transformer comprises a reflecting mirror on its rear face intended to cooperate with a lamp and a photo-electric cell controlling the feed of a relay whose energizing causes the feed of a tell-tale lamp and the closing of a circuit for effecting the end of the arrival of the product to be weighed.

No references cited.